United States Patent

[11] 3,537,541

| [72] | Inventors | Kanitilal P. Desai; Edward J. Moore, Tulsa, Okla. |
| --- | --- | --- |
| [21] | Appl. No. | 744,256 |
| [22] | Filed | July 2, 1968 Continuation-in-part of Ser. No. 691,748, Dec. 19, 1967, abandoned. |
| [45] | Patented | Nov. 3, 1970 |
| [73] | Assignee | Sinclair Research, Inc. New York, New York a corporation of Delaware |

[54] ACOUSTIC BOMB AND TRANSDUCER APPARATUS
6 Claims, 3 Drawing Figs.

[52] U.S. Cl. ................................................. 181/.5, 340/17; 73/153
[51] Int. Cl. ...................................................... G01v 1/28, E21b 49/00, G01v 1/16
[50] Field of Search ............................................. 181/.5(B)

[56] References Cited
UNITED STATES PATENTS

| 2,530,383 | 11/1950 | Estes et al. .................... | 181/0.5 |
| --- | --- | --- | --- |
| 2,862,200 | 11/1958 | Shepherd et al. ............. | 181/0.5X |
| 3,098,211 | 7/1963 | Gerber .......................... | 181/0.5X |
| 3,121,211 | 2/1964 | Eskin et al. .................... | 181/0.5X |
| 3,331,023 | 7/1967 | Adkins et al. ................. | 181/0.5 |

*Primary Examiner*—Benjamin A. Borchelt
*Assistant Examiner*—Thomas H. Webb
*Attorney*—Mc Lean, Morton and Boustead ABSTRACT: Apparatus for permitting calculation of dynamic moduli of earth formations by determining the longitudinal wave velocity and the shear wave velocity within a sample of the formation. The sample is held within a cylindrical shell, and the vertical pressure, the circumferential pressure and the pore pressure are individually varied to the desired levels. Longitudinal waves and shear waves are then transmitted through the sample. In one embodiment these waves are transmitted simultaneously by a single transducer and are received sequentially by another single transducer. In another embodiment the longitudinal waves and the shear waves are transmitted and received sequentially by separate sets of transducers. The transmitted and received waves are monitored, and the wave velocities are determined from the transmission times and the sample length.

INVENTORS
KANTILAL P. DESAI &
EDWARD J. MOORE

BY McLean, Morton & Boustead
ATTORNEYS

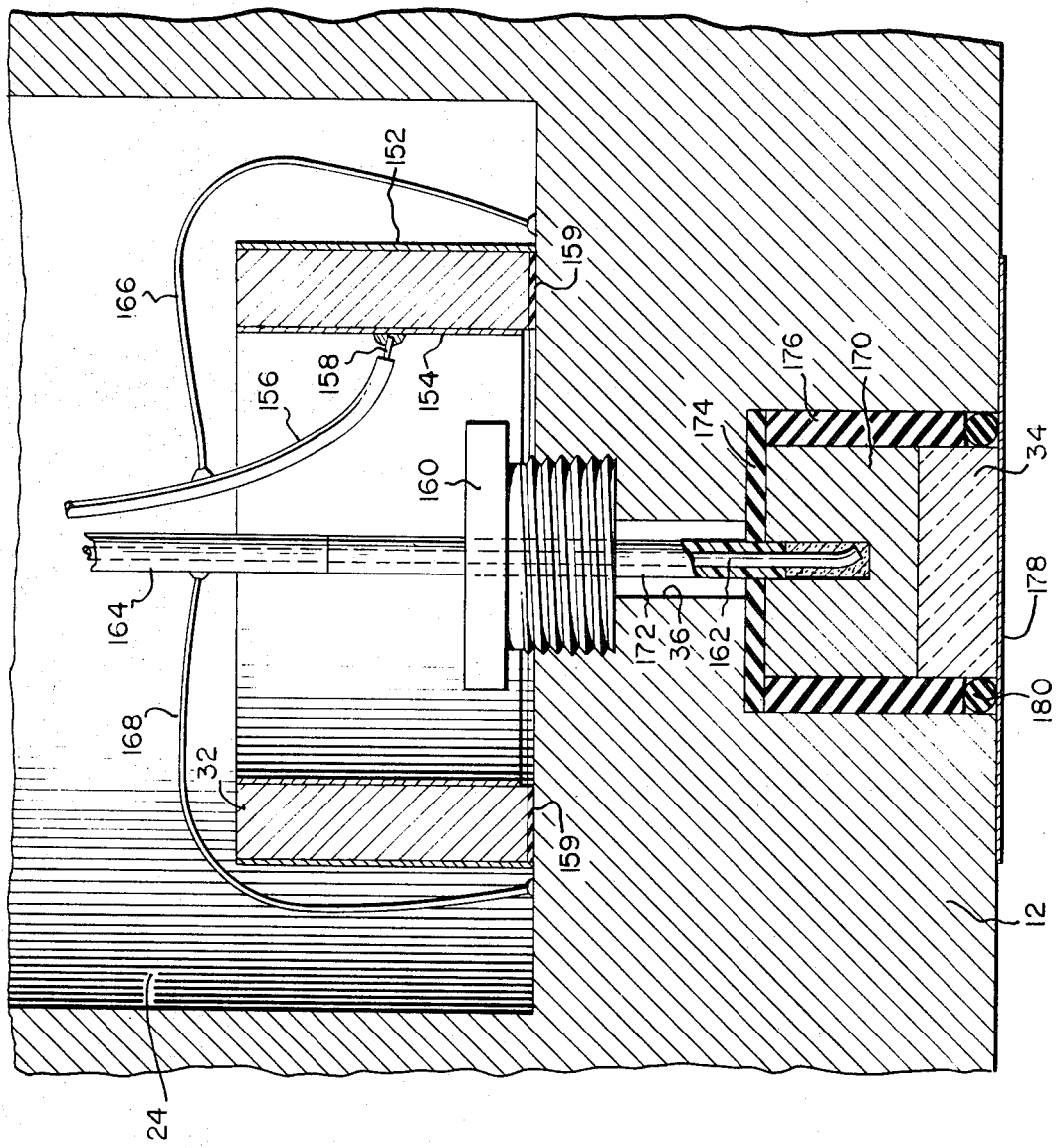

Patented Nov. 3, 1970

INVENTORS
KANTILAL P. DESAI &
EDWARD J. MOORE

BY McLean, Morton & Boustead
ATTORNEYS

ACOUSTIC BOMB AND TRANSDUCER APPARATUS

This application is a continuation-in-part of U.S. Pat. application Ser. No. 691,748, filed Dec. 19, 1967, , now abandoned.

A knowledge of the mechanical properties of earth formations is important in such fields as civil engineering and geophysical prospecting. Among the mechanical properties of interest are the static and dynamic elastic moduli. Numerous satisfactory methods exist for determining the static elastic moduli, but existing methods for determining dynamic elastic moduli are inadequate. Dynamic moduli may differ significantly from static moduli, and for many applications the dynamic moduli are more meaningful. At the depths below the earth's surface at which geophysical formations of interest are found, the earth's formation is subjected to high pressures. Because of the depths involved, the dynamic elastic moduli cannot easily be determined in situ. To obtain meaningful values of dynamic elastic moduli, a sample of the earth's formation must be subjected to correspondingly high pressures in the laboratory. A suitable method of determining dynamic elastic moduli of a sample of earth formation is to subject the sample to acoustic pulses and to measure the longitudinal wave velocity and the shear wave velocity simultaneously or sequentially within the sample. From these velocities and the density of the sample the dynamic elastic moduli can be determined.

For a homogenous isotropic sample the dynamic elastic moduli can be calculated from the relations:

$$E = \frac{\rho V_s^2 [4 - 3(V_1/V_s)^2]}{1 - (V_1/V_s)^2}$$

and $\eta = V^2_s \rho$, where E = Young's modulus, $\eta$ = shear or rigidity modulus, $\rho$ = density of the sample, $V_s$ = shear wave velocity, and $V_1$ = longitudinal wave velocity. The dynamic elastic moduli in a material which is not a homogenous isotropic material can be satisfactorily determined by testing several samples cut from the material in different directions.

While satisfactory apparatus for measuring both longitudinal wave velocity and shear wave velocity within a sample of material are presently available, most of these existing apparatus must be set up once to measure the longitudinal wave velocity and then disassembled and set up a second time to measure the shear wave velocity. Great difficulty is experienced exactly duplicating the test conditions so that the two readings are obtained under identical conditions in order to provide meaningful test data. Often it is not possible to use the same sample for the two tests, and so the results which are obtained are based on the frequently erroneous assumption that the samples utilized have identical properties.

The present invention is an apparatus for determining longitudinal wave velocity and shear wave velocity of a single sample of material in one test setup without disturbing the sample. The apparatus permits these determinations to be made under individually variable conditions of longitudinal, circumferential and pore pressure. The apparatus includes a rigid outer shell, means for holding the sample, means for subjecting the sample to independently variable vertical, circumferential and pore pressures, means for causing longitudinal waves and shear waves within the sample, means for receiving the longitudinal and shear waves after they have passed through the sample, and means for monitoring the applied waves and the received waves to permit determination of the wave velocities within the sample.

These and other aspects and advantages of the present invention are apparent in the following detailed description and claims, particularly when read in conjunction with the accompanying drawings in which like parts bear like reference numerals.

In the drawings:

FIG. 2 is an enlarged fragmentary longitudinal sectional view showing details of a portion of the embodiment of FIG. 1;

Figure 1:
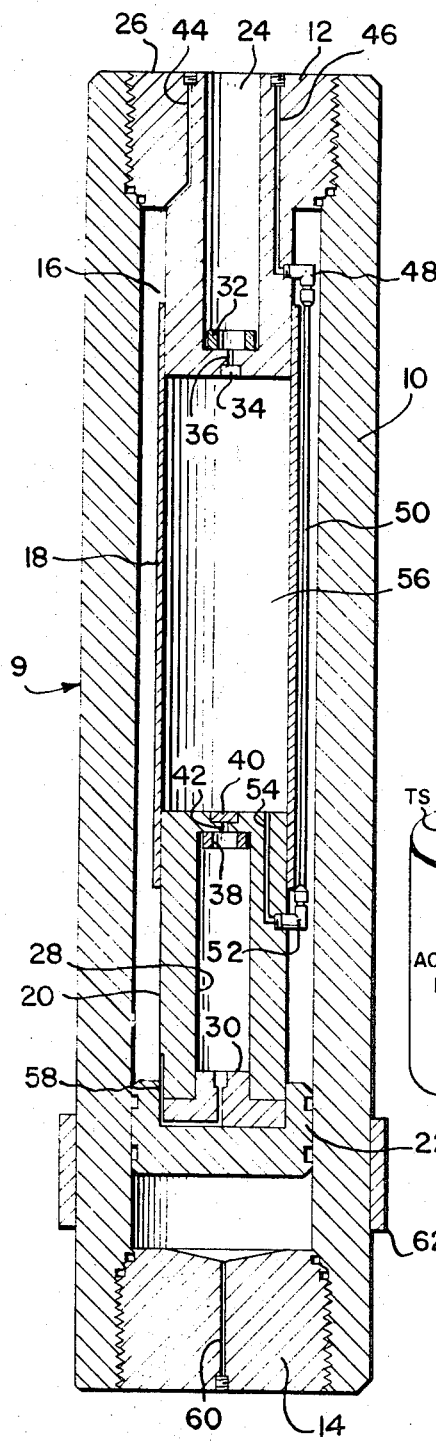
FIG. 1 is a longitudinal sectional view of a preferred embodiment of the acoustic bomb utilized in the present invention.

Within the acoustic bomb, designated generally by reference numeral 9 in FIG. 1, electroacoustic transducer 32 is mounted at the base of opening 24 inside holder 12, and electroacoustic transducer 34 is mounted on the outer surface of the base of holder 12, opposite transducer 32. Similarly, electroacoustic transducer 38 is mounted at the base of opening 28 inside holder 20, and electroacoustic transducer 40 is mounted on the outer surface of the base of holder 20, opposite transducer 38.

Holders 12 and 20 are a pressure resistant, electrically conductive material such as steel. Transducers 32 and 38 are tube-shaped electroacoustic transducers. Transducers 34 and 40 are disc-shaped electroacoustic transducers.

Transducers 32 and 38, which for example might be piezoelectric crystals, are adapted to generate longitudinal waves, since their principal mode of expansion is length. Transducers 34 and 40 are adapted to generate shear waves, and so advantageously might be AC cut quartz crystals. Alternatively, transducers 34 and 40 might be piezoelectric crystals generating shear waves of a much lower frequency than their longitudinal waves, and during subsequent electrical processing the longitudinal waves could be removed by filtering. Other suitable electroacoustic transducers could of course be utilized for transducers 32, 34, 38 and 40.

Details of the mounting of the transducers are apparent from FIG. 2 which is an enlarged fragmentary view showing the mounting of transducers 32 and 34. The outer surface of ring-shaped transducer 32 is covered by a conductor 152 which, for example, might be a brass shim stock. Conductor 152 contacts holder 12 to ground the outer surface of transducer 32. The inner surface of transducer 32 is covered by a conductor 154 of, for example, brass shim stock. Conductor 154 does not contact holder 12, thereby isolating the inner surface of transducer 32 from ground. Shielded wire 156 has its internal conductor 158 connected to conductor 154 which electrically connects conductor 158 to transducer 32. Conductor 154 increases the electrical contact area between conductor 158 and transducer 32. A thin layer 159 of insulatory material separates the lower surface of transducer 32 from closure 12.

Feed through connector 160 passes conductor 162 of shielded wire 164 through holder 12. The shields of shielded wires 156 and 164 are tied via wires 166 and 168, respectively, to ground at holder 12. Conductor 162 passes through connector 160 and opening 36 through the base of holder 12, and terminates in connector block 170. Electroacoustic transducer 34 is mounted in physical and electrical contact with block 170 which provides a firm base from transducer 34 while increasing the area of electrical contact between the transducer and conductor 162. Insulating sleeve 172 surrounds conductor 162 as it passes through connector 160 and opening 36. Likewise, insulating washer 174 and insulating sleeve 176 electrically insulate block 170 and transducer 34 from holder 12.

A sheet 178 of metal such as brass shim stock overlays transducer 34 and a portion of the exterior surface of holder 12, thereby grounding the outer surface of transducer 34. By way of example, sheet 178 might be attached to holder 12 by means of a suitable adhesive (not shown). Means such as O-ring 180 or a silicone rubber or similar plastic material seals the opening between transducer 34 and holder 12. Transducers 38 and 40 are mounted in a similar manner, with a small opening 42 provided through holder 20 to permit attachment of the required electrical connection to transducer 40.

The sample to be tested is placed between holders 12 and 20, in the zone designated by reference numeral 56 in FIG. 1, and a resilient sleeve 18 of, for example, neoprene is pulled over the sample and partially over holders 12 and 20. The sample, holder, and sleeve arrangement is then inserted within cylindrical shell 10. Holder 12 is rigidly attached to shell 10 by suitable means such as threads and provides a first end closure for shell 10. Holder 20 is slideable within shell 10. Head closure 30 closes opening 28 of holder 20. Piston 22 fits over head closure 30 and slideably engages the interior surface of shell 10. End closure 14 closes the second end of shell 10. If desired, a stand 62 can be attached to the outer surface of shell 10 to permit attachment of acoustic bomb 9 to a suitable support (not shown). Shell 10, end closure 14, piston 22, and head closure 30 are also any suitable pressure resistant material such as steel.

Electrical connections from transducers 32 and 34 pass to the exterior of acoustic bomb 9 through openings 24 and 36. Electrical connections from transducers 38 and 40 pass to the exterior of bomb 9 through similar suitable openings, for example openings 28 and 42, passageway 58 through head closure 30, and a suitable feed through (not shown) through holder 12.

A small passageway 44, passing through holder 12, is connected to a suitable source of oil or other hydraulic pressure transmitting means (not shown). This oil thus enters zone 16 between shell 10 and sleeve 18 and causes circumferential pressure upon the sample. Sleeve 18 insures that the sample is isolated from the hydraulic fluid.

Another suitable source of hydraulic pressure fluid (not shown) is connected to opening 46, through which the fluid passes via coupling 48 to flexible tube 50 within zone 16. From tube 50 the hydraulic fluid passes through coupling 52, on the exterior of holder 20, and opening 54, through holder 20, to act on the sample. Thus, hydraulic fluid entering opening 54 results in pore pressure within the sample.

A third source of hydraulic pressure is connected to opening 60 through end closure 14. Hydraulic fluid entering opening 60 acts on piston 22 which is slideably mounted within shell 10 to cause compressive pressure along the longitudinal axis of the sample. Since separate hydraulic connections are provided for each, the longitudinal pressure, the circumferential pressure and the pore pressure can be individually varied.

Figure 3:
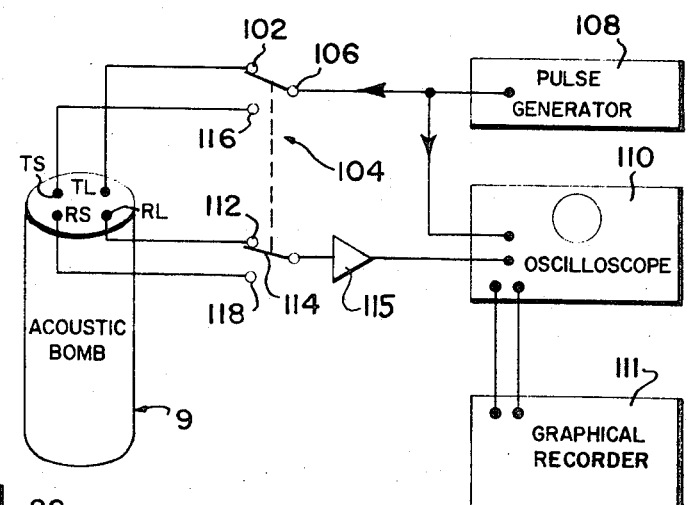
FIG. 3 is a block diagram depicting electrical connections utilized in practicing the present invention.

When the desired pressure conditions have been reached, the longitudinal and shear wave velocities are determined by means of the electrical apparatus depicted in FIG. 3. Transducer 38 is connected to fixed contact 102 of double-pole-double-throw switch 104. Moving contact 106 from the same pole of switch 104 is connected to the output of pulse generator 108, which also has its output connected to one input of dual trace cathode ray oscilloscope 110. Transducer 32, which receives longitudinal waves after they have passed through the sample, is connected to fixed contact 112, associated with the other pole of switch 104. Moving contact 114 of that pole is coupled through amplifier 115 to the second input of dual trace oscilloscope 110. If shear wave transducers 34 and 40 are piezoelectric crystals which also generate longitudinal waves, then, if desired, the output of amplifier 115 can be filtered before application to oscilloscope 110 to remove the higher frequency longitudinal waves.

Pulse generator 108 transmits a brief pulse to transducer 38, for example a pulse in the order of 60 volts for 7 microseconds. As a consequence, transducer 38 generates longitudinal waves which pass through the sample and are received by transducer 32. The pulse from generator 108 is also applied to oscilloscope 110 to establish an origin or reference point on the time scale. Upon receipt of the pulse, transducer 32 generates an electrical signal which is applied to oscilloscope 110. The horizontal axis on the display on oscilloscope 110 is calibrated in units of time. Therefore, the time duration between the application of the pulse from pulse generator 108 and the receipt of the pulse at transducer 32 can be determined. Since the length of the sample is known, this time reading can be coverted to a reading of longitudinal wave velocity. If desired, a permanent record of the pulses can be obtained via means such as graphical recorder 111 connected to oscilloscope 110.

To obtain readings of shear wave velocity switch 104 is turned to its second position in which moving contacts 106 and 114 are closed against fixed contacts 116 and 118, respectively. This connects pulse generator 108 to electroacoustic transducer 40, and connects electroacoustic transducer 34 to oscilloscope 110 via amplifier 115. The pulse output of generator 108 then is applied to transducer 40 to cause shear waves within the sample. By way of example, this pulse might be in the order of 1200 volts for 3 microseconds. When these waves reach transducer 34, an electrical signal is applied to oscilloscope 110. Again measurement of the time between application of the pulse to transducer 40 and receipt of the pulse by transducer 34, together with the sample length, permits determination of the shear wave velocity.

Figure 4:
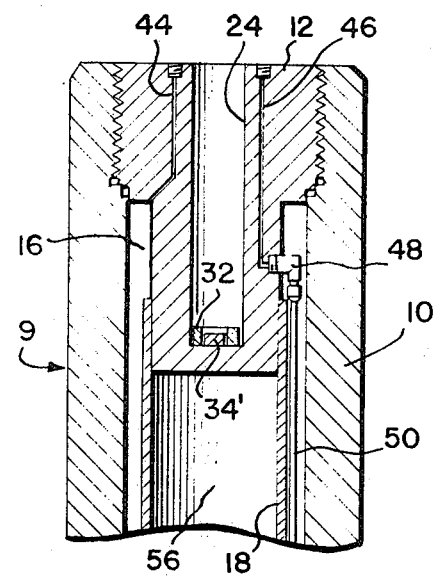
FIG. 4 is a fragmentary, longitudinal sectional view of a second embodiment of the acoustic bomb utilized in the present invention.

FIG. 4 depicts an alternative form of acoustic bomb in which the disc-shaped shear wave transducers are located within the central openings of the corresponding tube-shaped longitudinal wave transducers. Thus, shear wave transducer 34' is located within the central opening of the longitudinal wave receiving transducer 32 in the opening 24 on the inner surface of holder 12, and the small opening 36 is eliminated. The necessary conductive coating and insulation are provided, as in the embodiment of FIG. 1. The transmitting transducers are similarly mounted.

Figure 5:
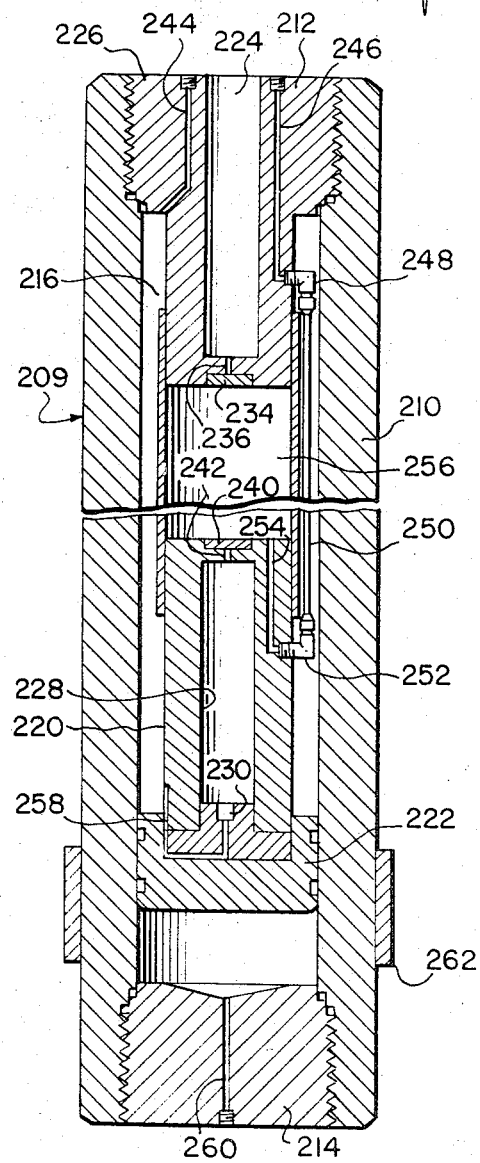
FIG. 5 is a longitudinal sectional view of another embodiment of the acoustic bomb utilized in the present invention.

FIG. 5 depicts an embodiment of the acoustic bomb in which longitudinal waves and shear waves are simultaneously generated by a single electroacoustic transducer and are received by another single electroacoustic transducer. Thus, use of this embodiment insures that the two wave velocities are measured under the same conditions. In addition, since the two wave velocities are measured with a single set of transducers, the same volume of sample material is traversed by the two waves.

Within the acoustic bomb of FIG. 5, generally designated by reference numeral 209, electroacoustic transducer 234 is mounted on the outer surface of the base of holder 212, and electroacoustic transducer 240 is mounted on the outer surface of the base of holder 220. Transducers 234 and 240 are rectangular-shaped electroacoustic transducers adapted to receive and to generate both longitudinal waves and shear waves. Transducers 234 and 240 might each be plate type piezoelectric crystals, by way of example. Other suitable electroacoustic transducers could, of course, be utilized.

Transducers 234 and 240 have a geometry which causes their longitudinal waves and shear waves to be generated with significantly different frequencies. Thus, illustratively, if transducer 240 is a rectangular piezoelectric plate crystal, the longitudinal waves generated have a frequency determined by the crystal thickness, for example a frequency of (75,000 thickness) hertz. Likewise, the shear waves generated have frequencies determined by the crystal length and width, for example frequencies of (75,000 length) hertz and (75,000 width) hertz. In one apparatus built in accordance with this embodiment of the present invention, transducers 234 and 240 were each piezoelectric plate crystals having a thickness of one-tenth inch, a length of one inch, and a width of one-half inch. Accordingly, the longitudinal waves generated had a frequency of 750,000 hertz, while the shear waves were generated at frequencies of 75,000 hertz and 150,000 hertz.

Transducers 234 and 240 are mounted in a manner similar to that depicted in FIG. 2 for transducer 34. There are, however, no tube-shaped transducers, of the type of transducer 32, required this embodiment. Accordingly, shielded wire 156, wire 166, conductors 152 and 154, and insulating layer 159 are not required. Since transducers 234 and 240 are rectangular-shaped, O-ring 180 is omitted and the opening between the transducers and their holders is sealed by a silicon rubber or similar plastic material.

The sample to be tested is placed within acoustic bomb 209 in the same manner as a sample is place placed within acoustic bomb 9, and the appropriate conditions of longitudinal pressure, circumferential pressure and pore pressure are individually obtained.

The electrical connections to the acoustic bomb 209 are similar to those depicted in FIG. 3 for acoustic bomb 9. However, since both the longitudinal waves and the shear waves are transmitted and received by a single set of transducers, double-pole-double-throw switch 104 is not required. Instead, the output of pulse generator 108 is directly connected to transducer 240, and transducer 238 is directly connected to the input of amplifier 115.

With this embodiment, pulse generator 108 transmits to transducer 240 a brief pulse, such as a pulse in the order of 60 volts for 2 microseconds, and transducer 240 generates high frequency longitudinal waves and lower frequency shear waves, both of which pass through the sample and are received by transducer 234. Because the energy of the faster traveling longitudinal wave substantially dies out before the strong initial pulse of the slower traveling shear wave is received at transducer 234, the two waves are easily distinguished.

Figure 6:
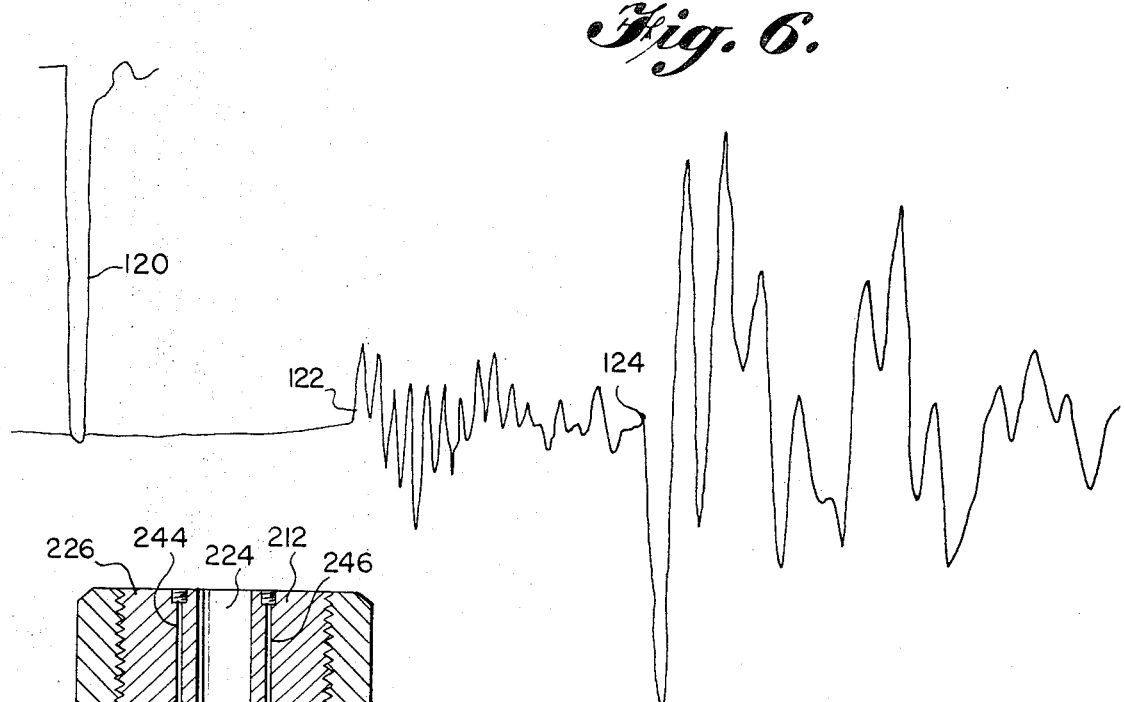
FIG. 6 is a graphical representation of waveforms obtained during longitudinal wave and shear wave velocity measurements utilizing the apparatus of FIG. 5.

FIG. 6 depicts the signals recorded by graphical recorder 111 during a typical operation of the apparatus of FIG. 5. Pulse 120 is the output from pulse generator 108 which establishes the time base. Pulse 120 is also applied to transducer 240 to generate longitudinal waves and shear waves within the sample in acoustic bomb 209. The longitudinal waves travel faster through the sample, and when these longitudinal waves arrive at transducer 234 they are amplified by amplifier 115 and displayed on the second channel of oscilloscope 110. After the received longitudinal wave energy has substantially died out, the slower traveling, lower frequency shear wave is received by transducer 234 and then amplified by amplifier 115 and displayed on the second channel of oscilloscope 110. Both the longitudinal and shear waves are recorded by graphical recorder 111. In FIG. 6 the first arrival of the received longitudinal wave is indicated at pulse 122 and the first arrival of the shear wave energy is depicted at pulse 124.

As can be seen in FIG. 6, the longitudinal wave energy arrives at transducer 234 before the shear wave energy and has a higher frequency than does the shear wave energy. The shear wave energy has a greater magnitude than does the longitudinal wave energy. Accordingly, there is no difficulty detecting the arrival of the shear wave energy at transducer 234. If desired, the longitudinal wave energy could be separated from the shear wave energy by means of an electronic filter and separate recordings made of the two waves, but this is not generally necessary. From the length of the sample in acoustic bomb 209 and the times which elapse between pulse 120 and pulses 122 and 124, the longitudinal wave velocity and the shear wave velocity can be readily determined.

We claim:

1. Apparatus for determining the velocity of waves within a sample of material, said apparatus comprising:
   a. an elongated cylindrical shell having first and second ends;
   b. first and second holding means for holding the sample within said shell, said first holding means being fixedly attached to said shell to close said shell first end, said second holding means being slideably mounted within said shell;
   c. a resilient sleeve connecting said first and second holding means to define a first zone within said sleeve in which said sample is to be located and a second zone between said sleeve and the interior surface of said shell;
   d. said first holding means having a passageway therethrough coupling said second zone to the exterior of said shell to permit introduction of hydraulic fluid into said second zone;
   e. means coupling said first zone to the exterior of said shell to permit introduction of hydraulic fluid into said first zone to act upon the sample;
   f. means for closing said shell second end and having a passageway therethrough to permit passage of hydraulic fluid therethrough to act upon said slideably mounted second holding means;
   g. means for transmitting waves through the sample;
   h. means for receiving the transmitted waves; and
   i. means for measuring the wave transmission time through the sample.

2. Apparatus as claimed in claim 1 in which said transmitting means comprises a first piezoelectric transducer coupled to a pulse generator for transmitting acoustic waves through said sample and said receiving means comprises a second piezoelectric transducer for receiving said acoustic waves after passage through said sample.

3. Apparatus as claimed in claim 1 in which:
   said transmitting means comprises a first piezoelectric crystal having a lengthwise principal mode of expansion for transmitting longitudinal acoustic waves through said sample and a second piezoelectric crystal having a transverse mode of expansion for transmitting shear acoustic waves within said sample, said first and second piezoelectric transducers selectively alternatively coupled to an electrical pulse generator; and
   said receiving means comprising a third piezoelectric crystal having a lengthwise principal mode of expansion for receiving longitudinal acoustic waves after passage through said sample and a fourth piezoelectric crystal having a transverse mode of expansion for receiving shear acoustic waves after passage through said sample.

4. Apparatus as claimed in claim 3 in which said first and third piezoelectric transducers are tube-shaped and are positioned one on the interior surface of each of said first and second holding means, and in which said second and fourth piezoelectric transducers are disc-shaped and are positioned one on the exterior surface of each of said first and second holding means.

5. Apparatus as claimed in claim 3 in which said first and third piezoelectric transducers are tube-shaped and are positioned one on the interior surface of each of said first and second holding means, and in which said second and fourth piezoelectric transducers are disc-shaped and are positioned one on the interior surface on each of said first and second holding means, within the central opening of the corresponding tube-shaped transducers.

6. Apparatus as claimed in claim 2 in which said first and second piezoelectric transducers are each rectangular-shaped piezoelectric plate crystals and are positioned one on the exterior surface of each of said first and second holding means.